(12) United States Patent
Ogata et al.

(10) Patent No.: US 6,230,831 B1
(45) Date of Patent: May 15, 2001

(54) WHEEL CHAIR WITH AUXILIARY POWER

(75) Inventors: Hiroaki Ogata; Kenji Tokura, both of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/230,008

(22) PCT Filed: May 18, 1998

(86) PCT No.: PCT/JP98/02183

§ 371 Date: Jan. 13, 1999

§ 102(e) Date: Jan. 13, 1999

(87) PCT Pub. No.: WO98/52508

PCT Pub. Date: Nov. 26, 1998

(30) Foreign Application Priority Data

May 19, 1997  (JP) .................................................. 9-128541

(51) Int. Cl.[7] .................................. B60K 1/00; H02P 5/50
(52) U.S. Cl. ........................ 180/65.1; 180/907; 180/65.5; 318/60; 318/445
(58) Field of Search ................................. 180/65.8, 65.5, 180/907, 65.1; 318/445, 66

(56) References Cited

U.S. PATENT DOCUMENTS

| 5,234,066 | * | 8/1993 | Ahsing et al. | 180/6.5 |
|---|---|---|---|---|
| 5,732,786 | * | 3/1998 | Fujigaki | 180/65.1 |
| 5,771,988 | * | 6/1998 | Kikutani et al. | 180/65.5 |
| 5,818,189 | * | 10/1998 | Uchiyama et al. | 180/907 |
| 5,860,487 | * | 1/1999 | Tanaka et al. | 180/206 |
| 5,878,829 | * | 3/1999 | Kanno et al. | 180/65.5 |
| 5,927,414 | * | 7/1999 | Kan et al. | 180/6.5 |
| 6,003,627 | * | 12/1999 | Ishida | 180/65.8 |
| 6,009,964 | * | 1/2000 | Ishida | 180/65.8 |
| 6,015,021 | * | 1/2000 | Tanaka et al. | 180/206 |
| 6,059,060 | * | 5/2000 | Kanno et al. | 180/65.8 |

FOREIGN PATENT DOCUMENTS

| 9-2371 | 1/1997 | (JP) . |
|---|---|---|
| 9-121401 | 5/1997 | (JP) . |

OTHER PUBLICATIONS

International Search Report PCT/JP98/02183 filed May 19, 1997.

* cited by examiner

*Primary Examiner*—Lanna Mai
*Assistant Examiner*—Jeffrey Restifo
(74) *Attorney, Agent, or Firm*—Ernest A. Beutler; Olson & Bear LLP

(57) ABSTRACT

A power-assisted wheelchair (1) having an electric motor (32), a potentiometer (27) as means for detecting human power applied to wheels (2), and a controller (31) as means for controlling the electric motor (32) according to the detected human power so as to set the time-attenuation rate of the assist power to be greater as the human power is smaller, and to be smaller as the human power is greater.

Therefore, the coasting amount of the wheelchair (1) for small indoor movements for example is restricted to a small value. As a result, small indoor movements with a small turning radius are made possible, a sufficient coasting amount is secured for an outdoor running. Therefore, along with the possibility of a comfortable running on a level road, a steep uphill running is made easy, and the physical effort of the rider is alleviated.

21 Claims, 14 Drawing Sheets

WHEEL CHAIR WITH AUXILIARY POWER

FIELD OF THE INVENTION

This invention relates to a power-assisted wheelchair wherein the assist power commensurate with the human power applied to right and left wheels is applied to each wheel so that the wheel is driven for rotation with the sum of the human power and the assist power.

TECHNICAL BACKGROUND

Such a power-assisted wheelchair is situated between the manual wheelchair and the motor-operated wheelchair. The human power applied intermittently to the paired right and left wheels is detected, and assist power commensurate with the detected human power is added respectively to the right and left wheels to alleviate the physical effort of the rider.

Here, with this kind of power-assisted wheelchair, the assist power is supplied intermittently every time the human power applied to each wheel is detected. After the human power is removed, the assist power is caused to attenuate with the lapse of time to provide the wheelchair rider with a coasting impression (Refer to the JP(A) Hei-8-168506).

However, the conventional power-assisted wheelchair so far has had problems: the time-attenuation rate of the assist power is set to be always constant irrespective of the magnitude of the human power and the running speed or the running direction (forward or reverse). As a result, on a road surface having a small running resistance, the running continues more than expected when the coasting amount is too great for example, and the turning radius cannot be made small for the small indoor movements. When the coasting amount is insufficient on the contrary, running is not easy on the road having a large running resistance or on a steep slope.

Also there are cases in which, when the wheelchair negotiates a step or the like, the wheelchair ends up in coasting farther than expected.

Furthermore, coasting of the wheelchair in the reverse direction causes unnecessary impression of fear to the rider. When the coasting amount is insufficient on the contrary, even if human power is applied to the wheels in the reverse direction or to counter the wheel rotation on a steep downhill for example with the intention of producing brake forces, stabilized brake forces may not be produced.

Therefore, the object of this invention is to provide a power-assisted wheelchair capable of making small radius indoor running, comfortable outdoor running, easy uphill running, stabilized downhill running, and eliminating the impression of fear during a reverse running.

SUMMARY OF THE INVENTION

To accomplish the above-described object, the invention of claim 1 is directed to a power-assisted wheelchair having an electric motor for producing assist power, means for detecting the human power applied to the right and left wheels, and means for controlling the electric motor according to the human power detected with the human power detecting means, the assist power commensurate with the human power detected with the human power detecting means being applied to each wheel to drive the wheel for rotation, characterized in that the control means controls the electric motor to produce the assist power when the human power is detected with the human power detecting means and at the same time to attenuate the assist power with the lapse of time, with the time-attenuation rate of the assist power changed according to running conditions.

The invention of claim 2 according to claim 1 is characterized in that the time-attenuation rate of the assist power is changed according to the magnitude of the human power.

The invention of claim 3 according to claim 2 is characterized in that the time-attenuation rate of the assist power is set to be greater as the human power is smaller, and to be smaller as the human power is greater.

The invention of claim 4 according to claim 2 or 3 is characterized in that the time-attenuation rate of the assist power may be optionally adjusted with an adjustment switch.

The invention of claim 5 according to claims 1 through 4 is characterized in that the power-assisted wheelchair is provided with means for detecting the running speed and means for detecting the running direction and that the time-attenuation rate of the assist power at least during the forward running is changed according to the magnitude of the running speed.

The invention of claim 6 according to claim 5 is characterized in that the time-attenuation rate of the assist power during the forward running is set to be greater as the running speed is smaller, and to be smaller as the running speed is greater.

The invention of claim 7 according to claim 5 or 6 is characterized in that the time-attenuation rate of the assist power in the reverse direction during the reverse running is set to be equal to or greater than that in the forward direction during the forward running.

The invention of claim 8 according to claim 5, 6, or 7 is characterized in that the time-attenuation rate of the assist power in the reverse direction during the forward running is set to be smaller than that of the assist power in the reverse direction during the reverse running.

The invention of claim 9 according to claims 1 through 8 is characterized in that the power-assisted wheelchair is provided with means for detecting the running speed, means for detecting the running direction, and speed deviation detecting means for storing the running speed at the time of the removal of the human power applied to the wheel and comparing it with a current running speed to detect a deviation between the two speeds, and that the time-attenuation rate of the assist power is changed according to at least one of the speed deviation and the time-integrated value of the speed deviation.

The invention of claim 10 according to claim 9, characterized in that the time-attenuation rate of the assist power is set to be greater as at least one of the speed deviation and the time-integrated value of the speed deviation is greater, and is set to be smaller as the value is smaller.

Therefore, with the invention of claims 1 through 4, a required coasting amount is secured according to the running condition of the wheelchair. Specifically, since the time-attenuation rate of the assist power is made greater as the human power is smaller, the coasting amount of the wheelchair is kept small for the small indoor-movements for example, small-indoor movements with a small turning radius are possible, and the convenience for the rider is improved. Also, since the time-attenuation rate of the assist power is made smaller as the human power is greater, a sufficient coasting amount is secured for the outdoor running, so that a comfortable running on a level road is made possible and at the same time a steep uphill running is made easy to alleviate the physical effort of the rider.

With the invention of claim 1, 5, or 6, a necessary coasting amount is secured according to the running condition of the wheelchair. Specifically, since the time-attenuation rate of the assist power is set to be greater as the running speed is smaller, and to be smaller as the running speed is greater, the coasting amount of the wheelchair is kept small for the small-indoor movements for example, small indoor movements with a small turning radius are possible, and the convenience for the rider is improved. At the same time, a comfortable outdoor running is possible with sufficient coasting amount being secured. Furthermore, in the case the wheelchair negotiates a step or the like, since the running speed is low, the time-attenuation rate increases. As a result, the wheelchair is prevented from coasting farther than anticipated after the negotiation and the rider is provided with an impression of stability.

With the invention of claim 7, since the time-attenuation rate of the assist power in the reverse direction during the reverse running is set to be equal to or greater than that in the forward direction during the forward running, the wheelchair does not coast excessively and no unnecessary impression of fear is caused to the rider.

With the invention of claim 8, since the time-attenuation rate of the assist power in the reverse direction during the forward running is smaller than that of the assist power in the reverse direction during the reverse running, a stabilized downhill running is possible when the wheelchair runs down a steep slope because a sufficient brake force remains in the reverse direction when a brake force is produced by applying human power in the reverse direction to counter the wheel rotation.

With the invention of claim 9 or 10, a sufficient coasting amount is secured according to the running condition of the wheelchair. Specifically, since the time-attenuation rate is set to be greater as at least one of the speed deviation and time-integrated value of the speed deviation is greater and to be smaller as the value is smaller, a large increase in the wheelchair speed after the removal of the human power input may be prevented irrespective of the magnitude of the human power and the running speed. Furthermore, for the invention of claims 1 through 4, unexpected increase in the wheelchair speed is prevented at the time of starting when a large operation force is required even on a road surface of a small running resistance. For the invention of claims 5 and 6, a sufficient coasting amount is secured even when running on a steep uphill where the running speed is low. This is compatible with the restriction of the coasting amount on a level road having a small running resistance.

THE BEST FORM FOR EMBODYING THE INVENTION

Figure 1:
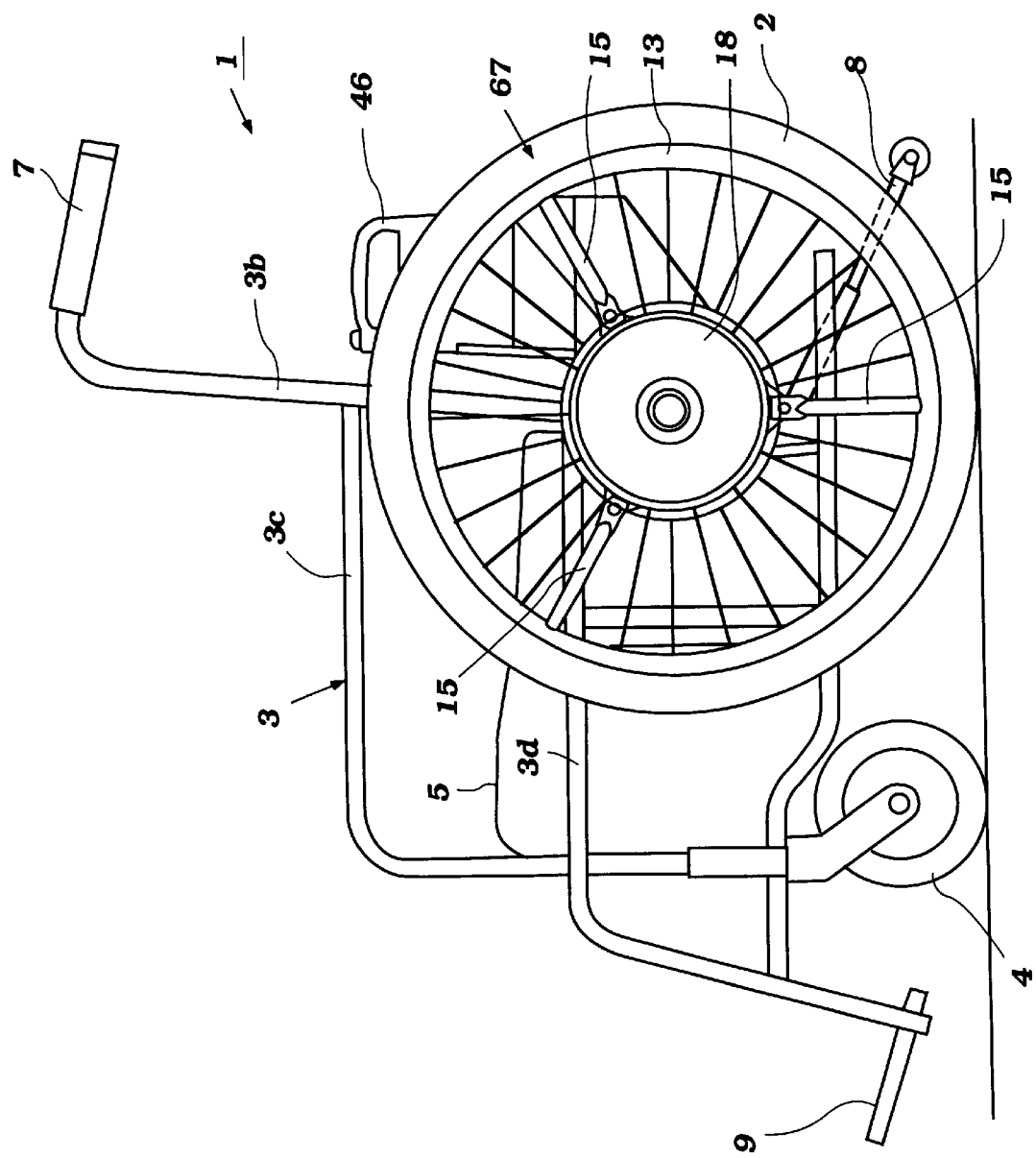
FIG. 1 is a side view of the power-assisted wheelchair of a first embodiment of the invention.
Figure 2:
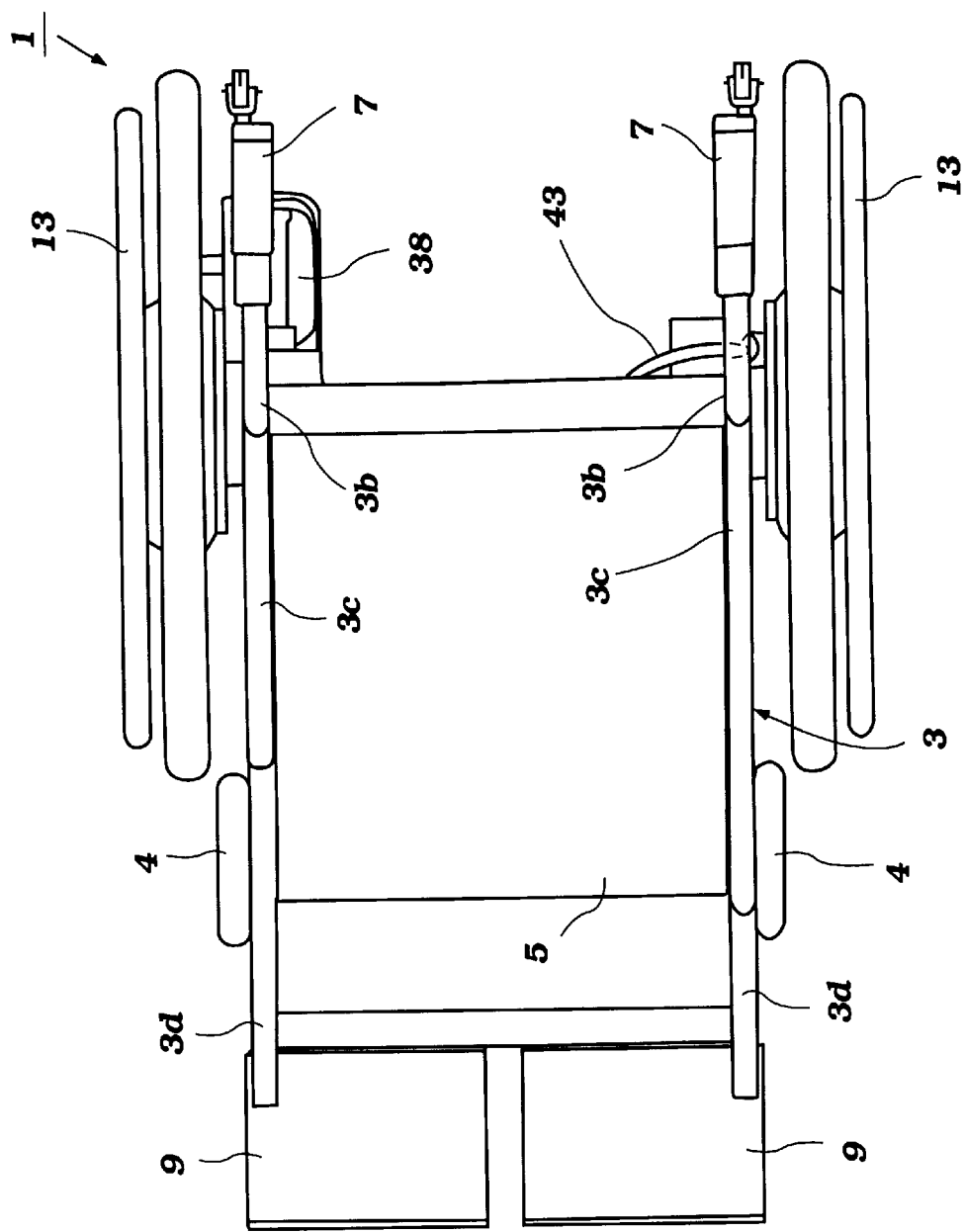
FIG. 2 is a top plan view of the same power-assisted wheelchair.

Embodiments of the invention will be described hereinafter in reference to the appended drawings.

The First Embodiment

A power-assisted wheelchair 1 of this embodiment has two, right and left wheels 2 driven for rotation with the human power applied to each wheel 2 and assist power added to each wheel 2 as commensurate with the human power. The wheelchair is constituted by attaching the wheels 2 serving as the drive wheels freely removably to the right and left sides of an existing manual wheelchair of a folding type. The front and rear portions of a vehicle body frame 3 made of pipes are supported for free movement with paired right and left casters 4 and wheels 2.

Figure 3:
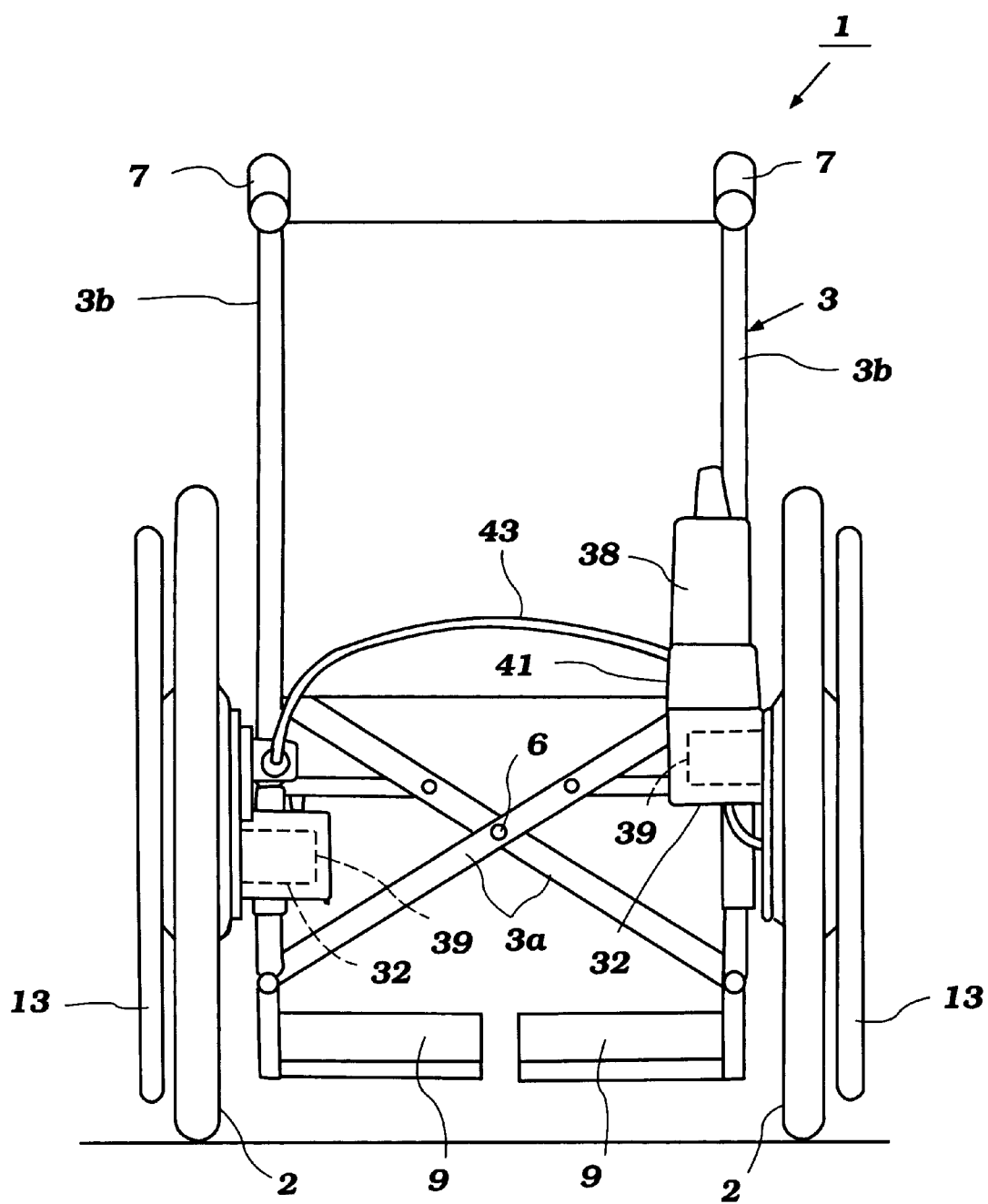
FIG. 3 is a back view of the same power-assisted wheelchair.

A cloth-made seat 5 for a rider to sit on is disposed in the center of the vehicle body frame 3. Here, the vehicle body frame 3 as shown in FIG. 3 has paired front and rear cross members 3a in an X-shape pivoted at their intersection with a shaft 6 so that the vehicle body may be folded around the shaft 6.

Paired right and left back pipes 3b are disposed vertically in the rear part of the vehicle body frame 3, with their top ends bent backward, and the bent portions are provided with grips 7 for a nursing person. Willy bars 8 for preventing falling are attached to positions inside the wheels 2 and extend obliquely rear downward (to the right in FIG. 1) of the vehicle body.

Paired right and left elbow pipes 3c horizontally extending from the middle height of the back pipes 3b of the vehicle body frame 3 toward the front of the vehicle body are bent generally at right angles at their front parts, and extend vertically downward, with their lower ends having casters 4 supported for free rotation. The front portions of paired right and left seat pipes 3d disposed below the elbow pipes 3c extend obliquely down forward of the vehicle body, with their extended ends (fore-ends) having paired right and left footplates 9.

Figure 6:
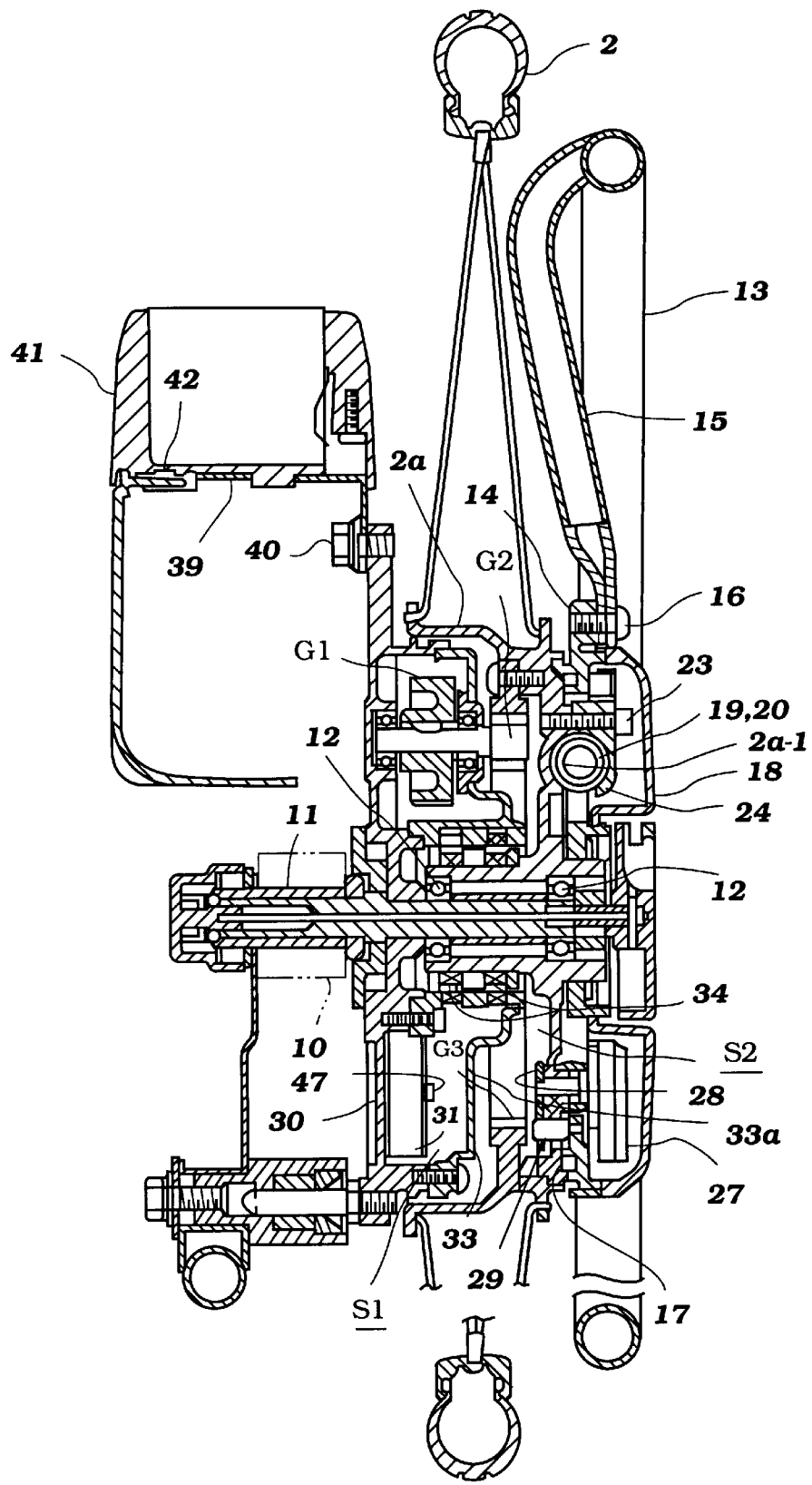
FIG. 6 is a cross-sectional view taken along the line B—B in FIG. 4.

As shown in FIG. 6, a hub 2a of each of the paired right and left wheels is supported for rotation through a ball bearing 12 on a wheel shaft 11 supported with a wheel shaft attaching boss 10 welded to the vehicle body frame 3. On the outer side of each wheel 2 is provided a ring-shaped hand rim 13 to be turned by the rider. The hand rim 13 is attached to a disk 14 through three spokes 15 using bolts 16, with the disk 14 supported for free rotation on a boss integrally formed with the hub 2a of the wheel 2. Therefore, the hand rim 13 may rotate independently of the wheel 2. In this embodiment as shown in FIG. 6, a seal ring 17 made of an elastic material is interposed between the hub 2a of the wheel 2 and the disk 14. The disk 14 is covered with a cover 18 connected to the disk 14. The seal ring 17 having the sealing function also serves as a friction damper for restricting the vibration in the circumferential direction associated with the inertia of the disk 14.

Figure 4:
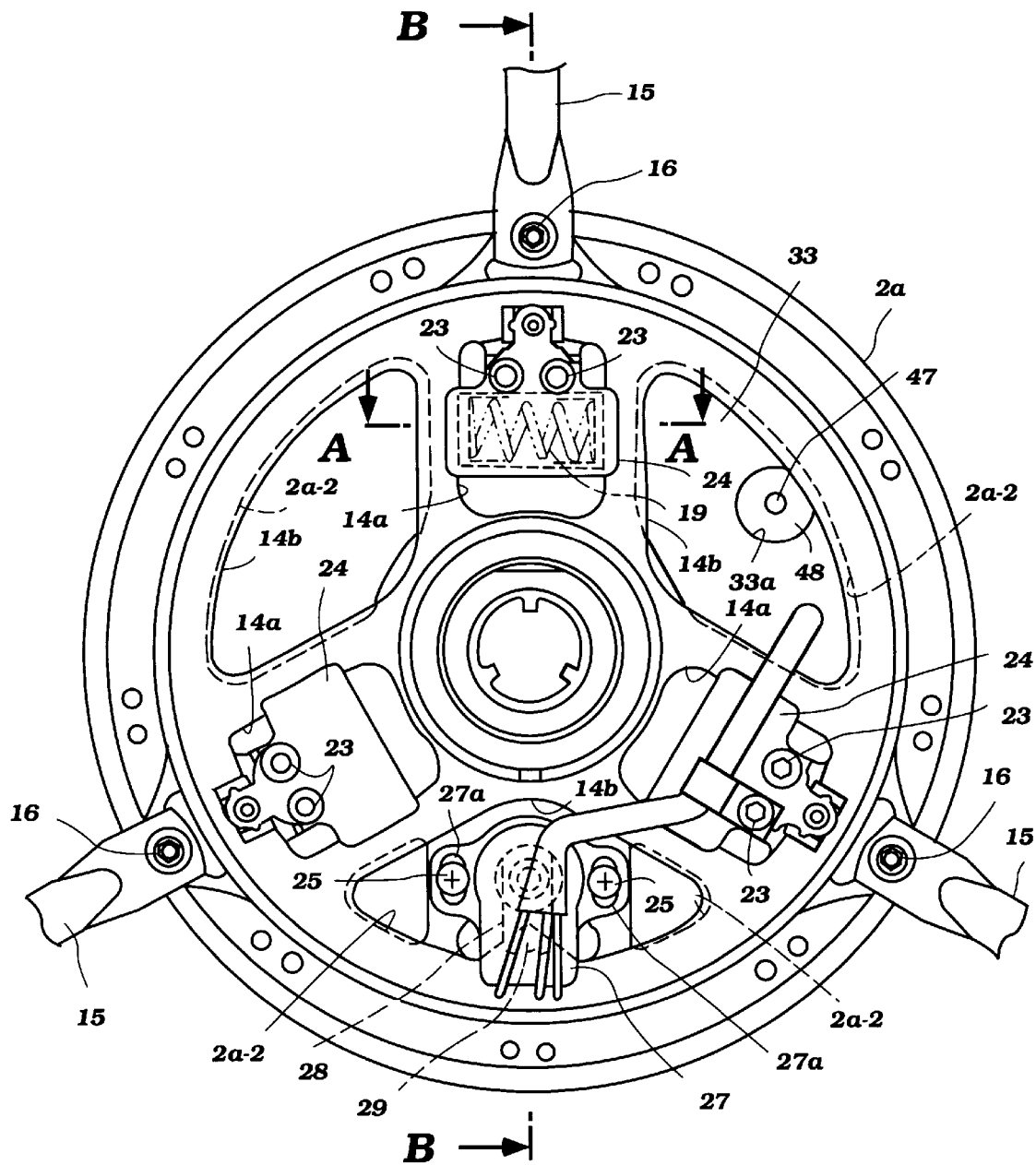
FIG. 4 is an axial view of the wheel of the same power-assisted wheelchair with a cover on the wheel hub portion being removed.
Figure 5A:
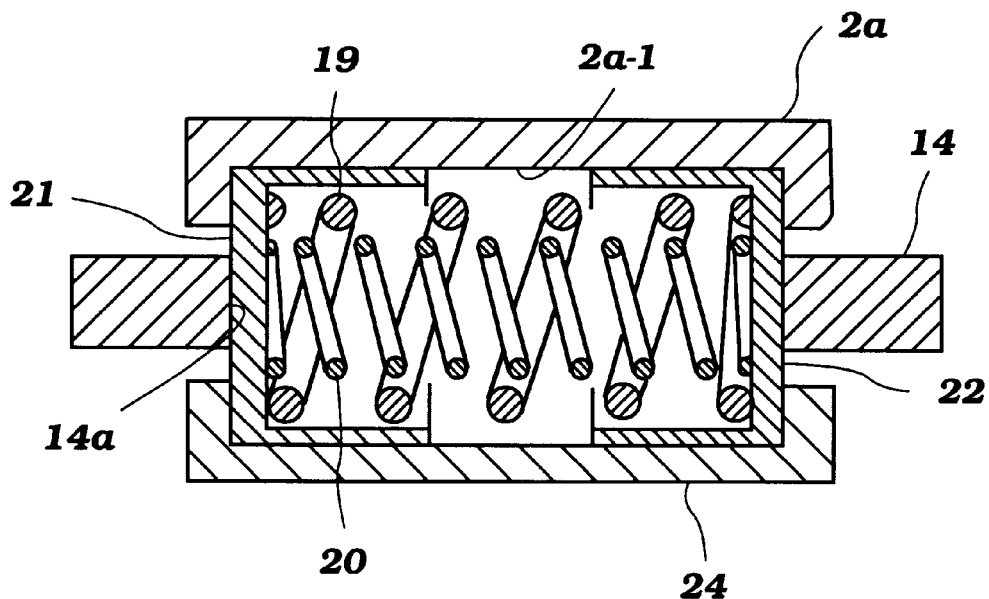
FIG. 5 is an enlarged cross sectional view taken along the line A—A in FIG. 4. View "a" shows the at rest condition and view "b" shows the condition when the operator applies a manual force to the hand rim.
Figure 5B:
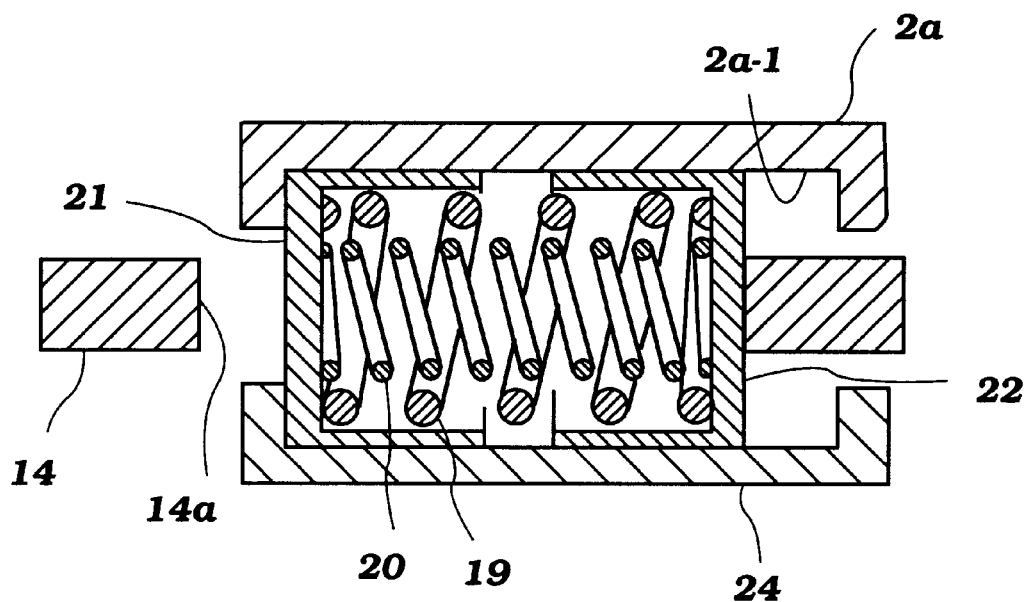

The hand rim 13 is elastically supported at its three circumferential positions for bi-directional rotation relative to the wheel 2 by means of a structure shown in FIGS. 4 and That is to say, as shown in FIG. 4, the disk 14 has rectangular holes 14a disposed at three positions along its entire circumference. As shown in FIG. 5, a large diameter spring 19 and a small diameter spring 20 are installed in a compressed state in a recess 2a-1 of a semicircular cross section formed in three positions on the end surface of the hub 2a of the wheel 2 and the rectangular hole 14a. As shown in FIGS. 4 and 6, the ends of the springs 19 and 20 are held with a retainer 24 secured with two bolts 23 on the hub 2a of the wheel 2. When no human power is applied to the hand rim 13, namely in the neutral state FIG. (5a), while the small diameter spring 20 is compressed with a certain preliminary load between spring receivers 21 and 22, both ends of the large diameter spring 19 are slightly apart from the spring receivers 21 and 22 without exerting any force on the spring receivers 21 and 22. Here, the spring constant of the large diameter spring 19 is set to be greater than that of the small diameter spring 20.

As shown in FIGS. 4 and 6, a potentiometer 27 for detecting, from the amount and direction of relative rotation between the wheel 2 (hub 2a) and the hand rim 13 (disk 14), the magnitude and direction of the human power applied to the hand rim 13 is position-adjustably attached to the external end surface of the hub 2a using bolts 25 passing through elongate holes 27a formed in the hub 2a (Refer to FIG. 4). One end of a lever 28 is secured to the end of the input shaft of the potentiometer 27 while the other end of the lever 28 engages through an elongate hole with a pin 29 projecting from the disk 14.

Figure 7:
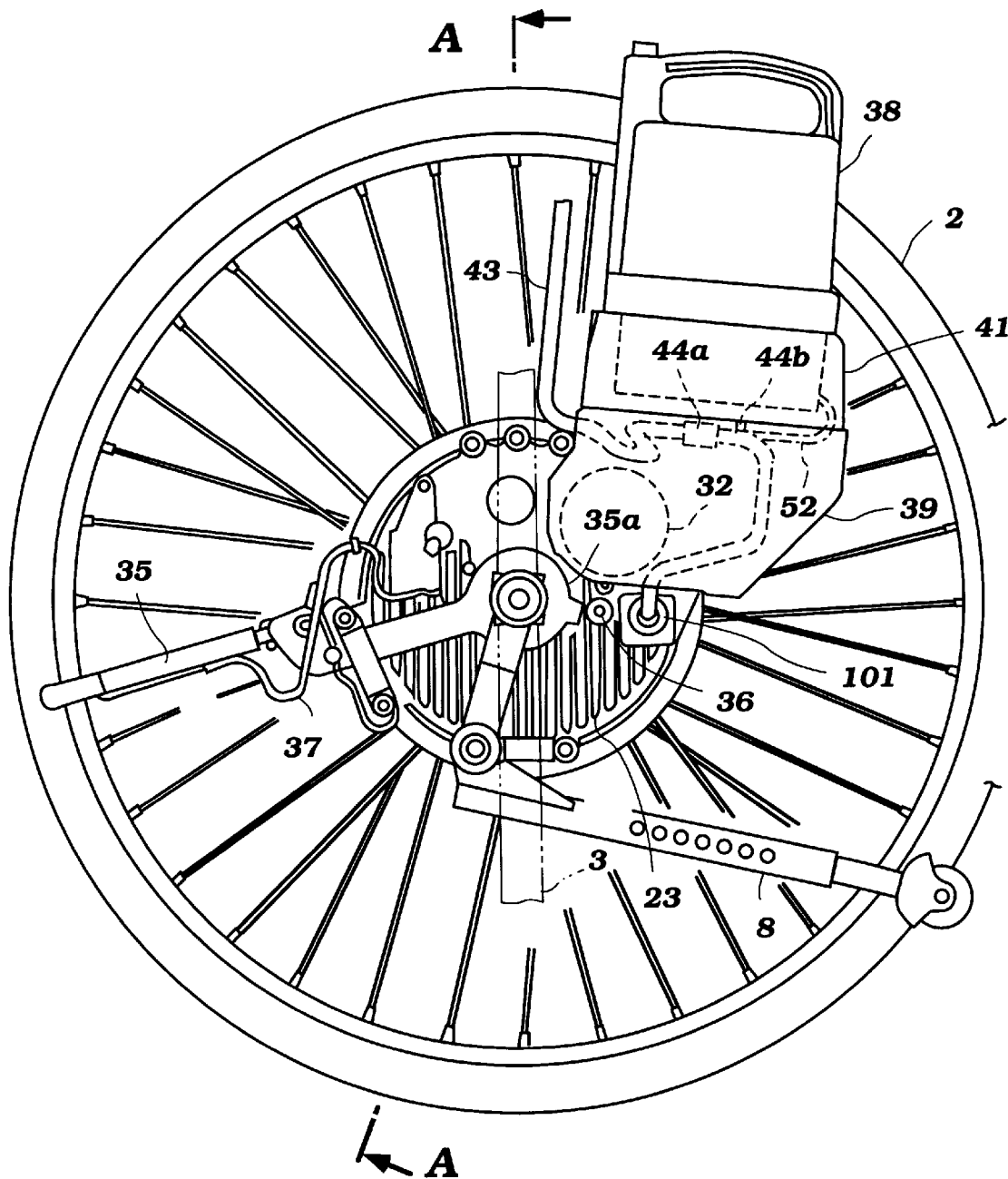
FIG. 7 is an internal side view of the right hand wheel of the same wheelchair as the first embodiment of the invention.
Figure 8:
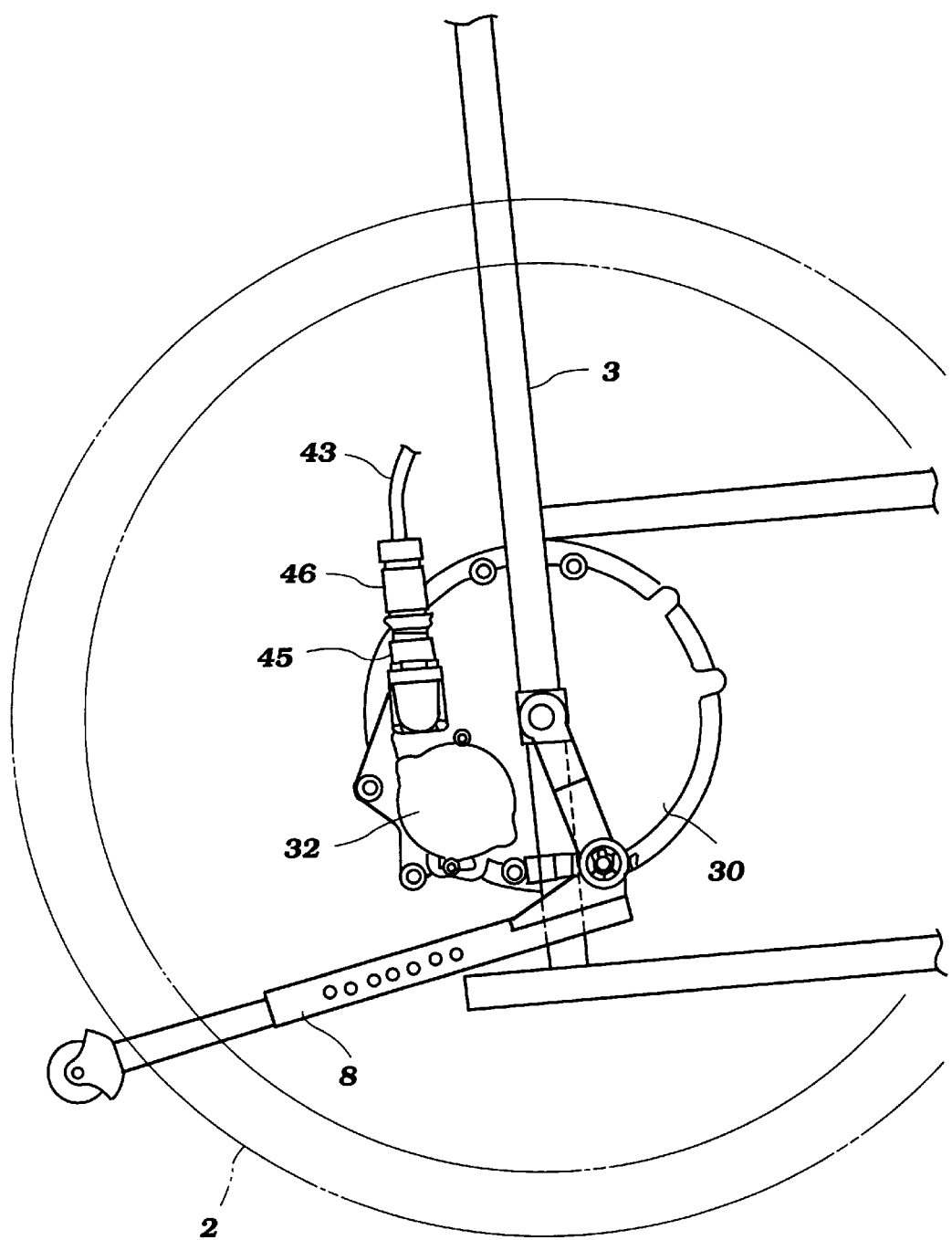
FIG. 8 is an internal side view of the left hand wheel of the same power-assisted wheelchair.

As shown in FIGS. 6 through 8, a disk-shaped securing plate 30 is secured to a wheel shaft 11 in a position inside the hub 2a, with respect to the vehicle width direction, of each of the paired right and left wheels 2. A controller 31 constituting a control means and an electric motor 32 as a drive source are attached to the securing plate 30.

A space surrounded with the securing plate 30 is formed inside of each wheel 2, and the space is divided with a ring-shaped partition wall 33 into chambers S1 and S2. The controller 31 is disposed in the chamber S1. Here, a rotary transformer 34 performs signal transmission between the controller 31 and the potentiometer 27.

The assist power produced with each electric motor 32 is transmitted to each wheel 2 through a power transmitting means constituted with components including a belt transmission mechanism G1 and gears G2 and G3.

The input detection means constituted with the above-described springs 19 and 20, and the potentiometer 27; the signal transmission means constituted with the rotary transformer 34; the control means constituted with the controller 31; and the power transmission means constituted with the components including the electric motor 32, belt transmission mechanism G1, and the gears G2 and G3 configure an assist power unit. The assist power unit is disposed compactly in radial and axial directions around the wheel shaft 11 of the hub 2a of each wheel 2. The paired right and left wheels 2 each having the assist power unit disposed within the hub 2a are removably attached to the vehicle body as described before.

The power-assisted wheelchair 1 of this embodiment has a main switch (not shown) disposed within the hub 2a of the right hand wheel 2. The main switch is turned on and off by the turning operation of a lever 35 shown in FIG. 7. That is to say, the lever 35 is attached for free turning to the wheel shaft 11. The base portion of the lever 35 is formed with a partial gear 35a which engages with a sector gear 36 for turning on and off the main switch. An LED (light emitting diode, not shown) for indicating the on or off state of the main switch is embedded in the fore-end of the lever 35. A lead wire 37 extending from the LED is electrically connected to a battery 38 which will be described later.

As shown in FIGS. 1 and 7, the power-assisted wheelchair 1 of this embodiment has a battery 38 disposed freely removably on the right wheel 2 side. That is to say, as shown in FIG. 6, a bracket 39 is secured with a bolt 40 to the securing plate 30 of the right wheel 2. A battery holder 41 is secured with a screw 42 to the upper part of the bracket 39. The battery 38 is freely removably installed in the battery holder 41.

When the main switch is turned on by turning operation of the lever 35 under the condition of the battery 38 being installed in the battery holder 41, power of the battery 38 is supplied through wire harnesses 52 and 43 to the assist power units disposed on the right and left wheels 2 to drive the assist power units.

As shown in FIG. 7, the wire harnesses 43 and 52 are electrically interconnected through couplers 44a and 44b. One end of the wire harness 43 is electrically connected to the assist power unit of the right wheel 2, and the other end of the same wire harness 43 is electrically connected to the assist power unit of the left wheel 2 as shown in FIG. 8. As shown also in FIG. 8, a coupler 45 is attached to the securing plate 30 of the left wheel 2. The wire harness 43 is electrically connected to the assist power unit of the left wheel 2 by connecting the coupler 46 secured to the end of the wire harness 43 to the coupler 45 by a quick, easy action.

With this embodiment, the zero point of the potentiometer 27 is adjusted by loosening the bolt 25 shown in FIG. 4 and changing the position of the potentiometer 27. In the controller 31 secured to the securing plate 30 is disposed an LED 47 (See FIGS. 4 and 6) that lights up when the zero point adjustment of the potentiometer 27 is completed. As shown in FIG. 4, a circular adjustment window 33a facing the LED 47 is formed in the partition wall 33 in the wheel 2 at a position opposite the LED 47. A circular, transparent member 48 is fitted in the adjustment window 33a. Here, while the transparent member 48 is employed in this embodiment, the entire partition wall 33 may be made transparent, or the portion of the partition wall 33 may be made thin and semi-transparent at a position opposite the LED 47 to visually recognize the LED 47.

As also shown in FIGS. 4 and 6, the LED 47, the adjustment window 33a, and the transparent member 48 are disposed so that openings 2a-2 formed at four positions along the entire circumference of the end surface of the hub 2a and sector-shaped openings 14b formed at three positions along the entire circumference of the disk 14 may be aligned with each other in the direction of the wheel shaft 11. Therefore, at the time of adjusting the zero point of the potentiometer 27, the lighting of the LED 47 (or the zero-adjusted state of the potentiometer 27) may be visually recognized from outside of each wheel 2 when the cover 18 (See FIG. 6) is removed.

Next, the function of the power assisted wheelchair 1 will be described in reference to FIGS. 9 through 12.

When the rider applies human power to the paired right and left hand rims 13 to turn to forward direction for example, the hand rims remain at rest until the magnitude of the human power applied to each hand rim 13 overcomes the preliminary compressive force of the three small diameter springs 20, and no relative rotation occurs between the hand rim 13 and the wheel 2. At this time, the output of the potentiometer 27 is zero.

When the human power increase thereafter, only the small diameter spring 20 is compressed first with the disk 14, and the hand rim 13 makes a relative rotation by an angle commensurate with the compressed amount of the spring 20. The relative rotation amount of the hand rim 13 is magnified with a lever 28 and transmitted to the potentiometer 27. The potentiometer 27 outputs a signal commensurate with the human power applied to the hand rim 13. The signal is sent to the control section of each controller 31 through the rotary transformer 34. Here, since the spring constant of the small diameter spring 20 is small, the compressed amount of the spring 20 (or the rotation amount of the hand rim 13) relative to the increase in the amount of the human power is large. Therefore, the sensitivity of the potentiometer 27 is kept high. As a result, it is possible for the rider to make finely sensitive operations.

When the magnitude of the human power applied to the hand rim 13 reaches a specified value, the large diameter spring 19 also begins to be compressed together with the small diameter spring 20, the hand rim 13 rotates relative to the wheel 2 by an angle commensurate with the compressed amounts of the springs 19 and 20, and the potentiometer 27 outputs a signal commensurate with the magnitude of the human power applied to the hand rim 13.

Thereafter, when the magnitude of the human power applied to the hand rim 13 increases beyond the specified value, both of the spring receivers 21 and 22 come into contact with each other, so that the human power is transmitted directly to the wheel 2. At this time, the output of the potentiometer 27 is constant.

The human power applied intermittently to the hand rim 13 is detected with the potentiometer 27 as described above, and the detection signal is inputted through the rotary transformer 34 to the control section of the controller 31.

The control section of the controller 31 determines the magnitude of the human power applied to the hand rim 13 according to the input signal outputted from the potentiometer 27, supplies an electric current commensurate with the magnitude of the human power to the electric motor 32 to drive the electric motor 32 for rotation so as to produce a required assist power. Here in this embodiment, a current control type (torque control type) is employed for the assist power control. A type of control is employed in which the assist power produced with the electric motor 32 is controlled along the constant voltage characteristic by restricting the duty ratio within the current control loop.

Figure 9:
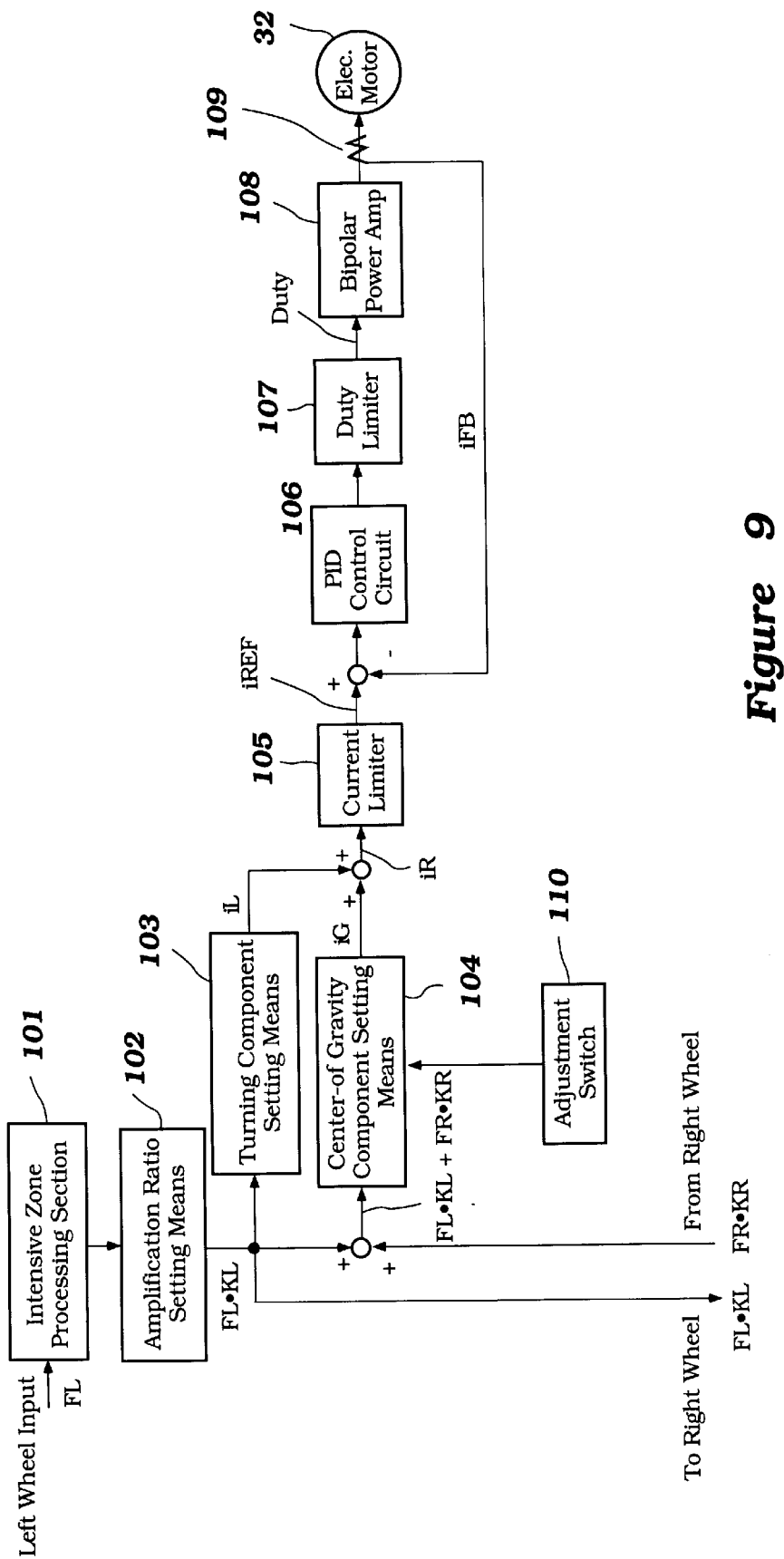
FIG. 9 is a block diagram showing a constitution of a control system of the same power-assisted wheelchair.

Here, the controlling operation of the controller 31 provided on the left wheel 2 will be described in reference to FIG. 9. Since the controlling operation for the right hand controller 31 is similar to that of the left hand controller 31, explanation on the right hand controller 31 will be omitted.

When the human power FL applied to the hand rim 13 of the left wheel 2 is detected with the potentiometer 27, the detection signal is inputted to an insensitive zone processing section 101 of the controller 31. If the detected human power FL exceeds a threshold set as the insensitive zone, an amplification ratio KL is set with an amplification ratio setting means 102. In a turning component setting means 103, a turning torque iL as a component causing a turning motion is determined from the product (FLKL) of the human power FL and the amplification ratio KL.

In a center-of-gravity setting means 104, a center-of-gravity torque iG as a component causing a straight-line motion is determined from a time-attenuation rate map which is set in the center-of-gravity setting means 104 and a sum of products (FLKL+FRKR) where FL and FR are left hand and right hand human power, and KL and KR are amplification ratios respectively corresponding to the human power. Incidentally, the time-attenuation ratio map may be of a single kind, or plural kinds to be optionally selected with an adjustment switch 110.

Figure 10:
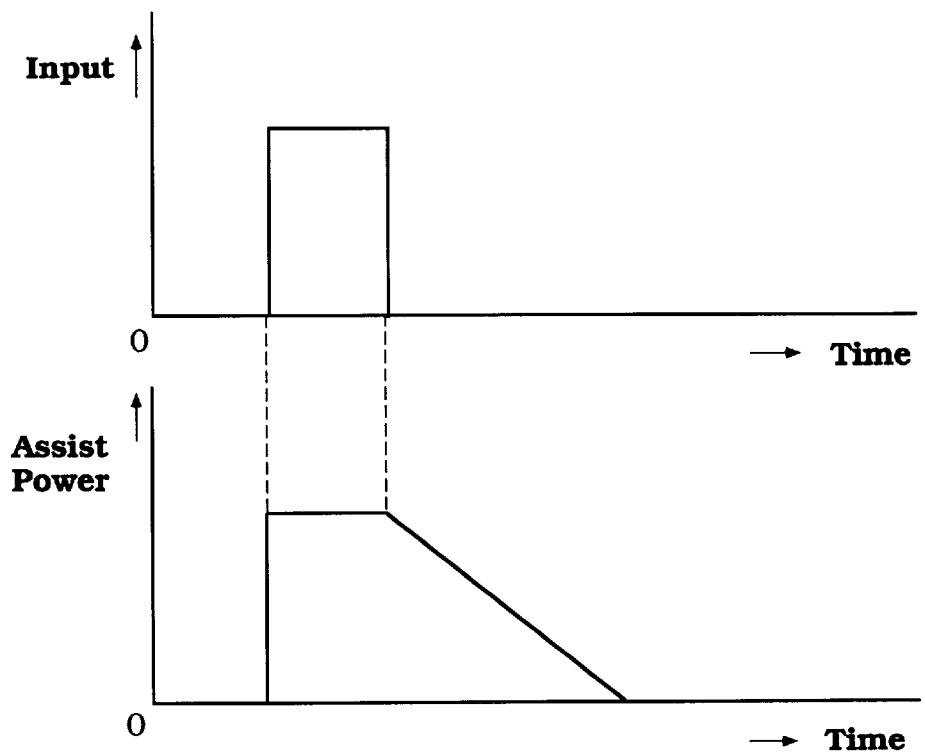
FIG. 10 is a pair of graphs showing the change with time in the human power and the assist power.

By calculating the sum of the turning torque iL and the center-of-gravity torque iG, a target torque iR is determined. In a current limiter 105, a target current iREF necessary for the electric motor 32 to produce the target torque iR is determined. A correction amount is determined with a PID control circuit 106 from the difference (iREF iFB) between the target current iREF and the actually flowing current iFB detected with a current detection sensor 109. Then, voltage is checked with a duty limiter 107, and a specified control signal (duty ratio) is outputted. The control signal (duty ratio) is converted to an actual current with a bipolar power amplifier 108. A specified current is supplied to the electric motor 32, and simultaneously with the detection of the human power as shown in FIG. 10, a desired assist power commensurate with the human power is produced in the electric motor 32. Here, as shown in FIG. 10, the assist power attenuates with a specified time-attenuation rate after the removal of the human power.

When the desired assist power is produced as the electric motor 32 is driven as described above, the rotation is transmitted to the right and left wheels 2 through the power transmission means including the belt transmission mechanism G1, and the gears G2 and G3. Then, the right and left wheels 2 are driven with the driving forces of the magnitudes as the sum of the human power and the assist power. As a result, the wheelchair 1 is driven forward and the rider may operate the wheelchair 1 easily with a small, about a half of, for example, the fall driving forces.

Figure 11:
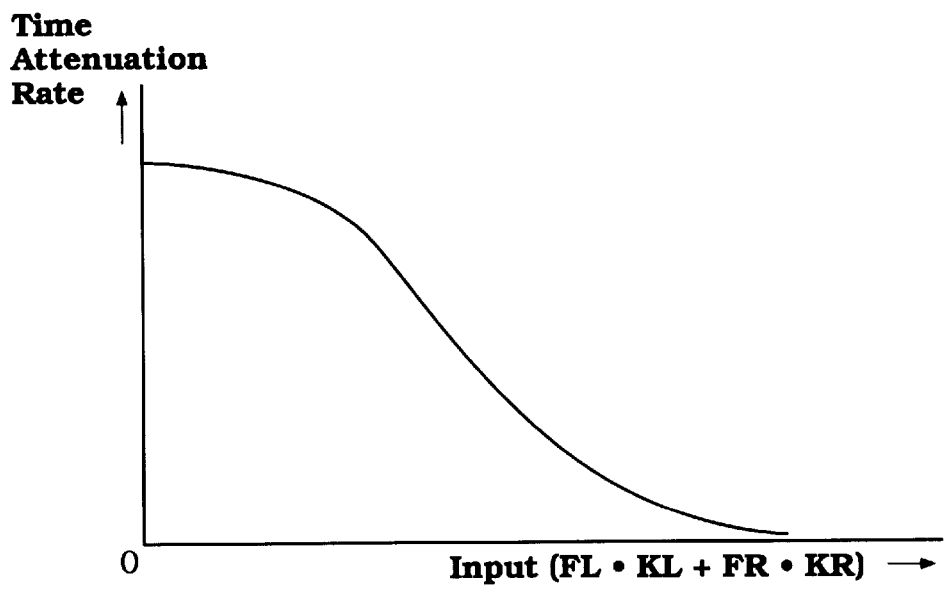
FIG. 11 is a graph showing the relationship between the time-attenuation rate of the assist power and the human power.

Here in this embodiment described above, the electric motor 32 is controlled so that the assist power is produced upon the detection of the human power with the potentiometer 27 and that the assist power attenuates with the lapse of time, with the time-attenuation rate changing according to the magnitude of the human power. Specifically as shown in FIG. 11, the time-attenuation rate of the center-of-gravity torque of the assist power is set to be greater assist decay faster as the human power (FLKL+FRKR) is smaller, and to be smaller assist decay slower as the human power (FLKL+FRKR) is greater, and the value may be optionally adjusted with the adjustment switch 110 described before.

By arranging as described above so that the smaller the human power, the greater the time-attenuation rate of the assist power, the coasting amount of the wheelchair 1 is kept small for small indoor movements for example. As a result, small indoor movements with a small turning radius are made possible and the convenience for the rider is improved.

Also, since the time-attenuation rate of the assist power is made smaller as the human power is greater, a sufficient coasting amount is secured for the outdoor running where the human power input is relatively great. As a result, a comfortable running is secured on a level road and at the same time a steep uphill run is made easy and so the physical load on the rider is alleviated.

The Second Embodiment

Next, the second embodiment of the invention will be described in reference to FIGS. 12 and 13.

The power-assisted wheelchair of this embodiment has the same fundamental constitution as that of the first embodiment and so its explanation will be omitted. Furthermore, in FIG. 12, the same elements as those in FIG. 9 are provided with the same symbols.

The power-assisted wheelchair of this embodiment is provided with means for detecting the running speed, and means for detecting the running direction (forward or reverse) (specifically, a vehicle speed calculation means 111 which will be described later), and is adapted to change the time-attenuation rate of the assist power according to the magnitude of the running speed, running direction (forward or reverse), and the direction (forward or reverse) of the assist power.

Here, a method of determining the running speed (center-of-gravity speed) will be described in reference to FIG. 12.

Figure 12:
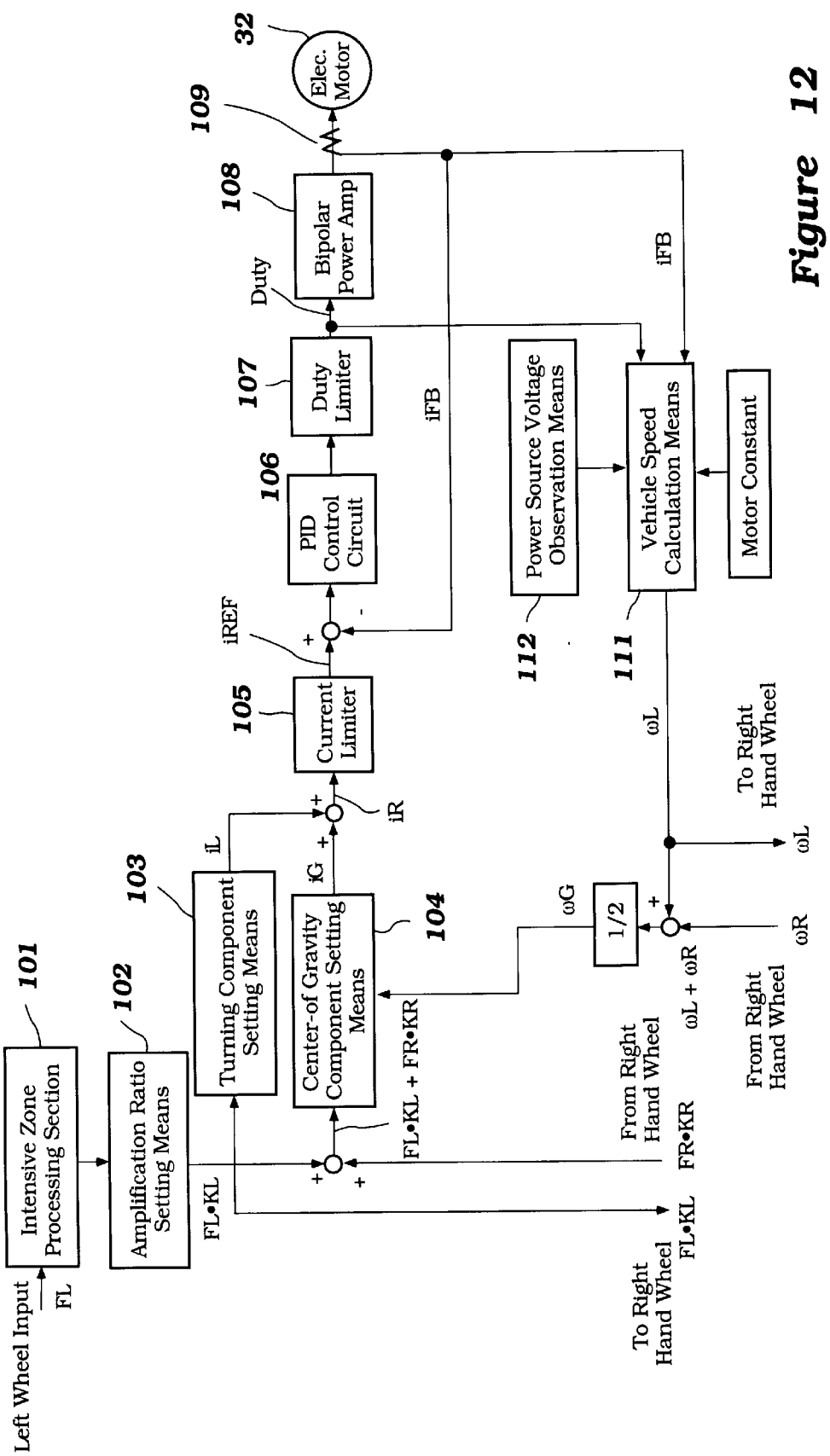
FIG. 12 is a block diagram showing a constitution of a control system of a power-assisted wheelchair as a second embodiment of the invention.

As shown in FIG. 12, the controller 31 has a vehicle speed calculation means 111 which calculates the (rotation) speed L of the left wheel 2 from a current iFB detected with the current sensor 109, a control signal (duty ratio) outputted from the duty limiter 107, and a motor constant (motor resistance, start voltage coefficient, etc.). The sum (L+R) of L and a similarly determined speed R of the right wheel is divided by two to determine the center-of-gravity speed (rotation speed) G. The center-of-gravity speed G is outputted to the center-of-gravity component setting means 104. In FIG. 12, the symbol 112 denotes a power source voltage observation means.

Figure 13:
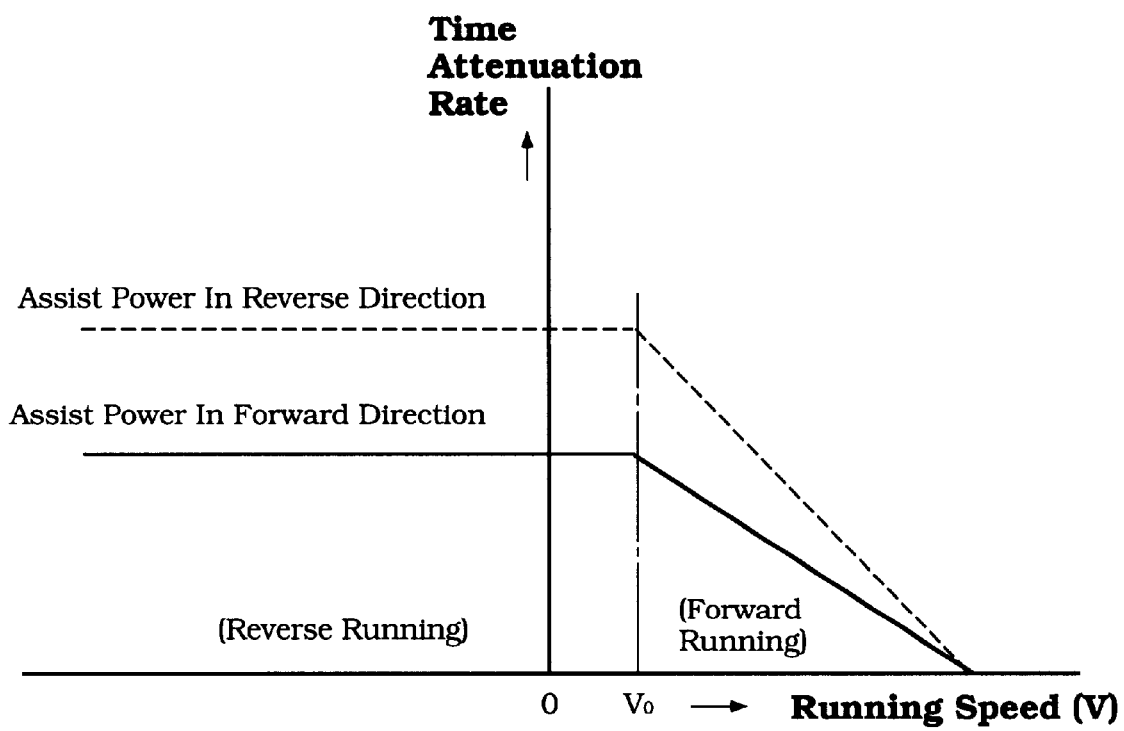
FIG. 13 is a graph showing the relationship among the time-attenuation rate of the assist power, the running speed, and the running direction.

In this embodiment, as shown in FIG. 13, when the forward running speed V exceeds $V_0$, the time-attenuation rate of the assist power in forward and reverse directions is set to be smaller as the running speed V is greater, and to be greater as the running speed V is smaller. The time-attenuation rate of the assist power at low speeds with V being less than $V_0$, and the time-attenuation rates of the assist power in forward and reverse directions during the reverse running are set respectively to greater values. Incidentally, while the time-attenuation rates of the assist power in forward and reverse directions during the reverse running are set constant in this embodiment, they may be set to greater values as the reverse running speed increases.

The time-attenuation rate of the assist power in the reverse direction during the reverse running is set equal to or greater than that in the forward direction during the forward running. The time-attenuation rate of the assist power in the reverse direction during the forward running is set smaller than that in the reverse direction during the reverse running.

With this embodiment described above, a required coasting amount can be secured according to the running condition of the wheelchair 1. Specifically, since the time-attenuation rate of the assist power is set to be greater as the running speed V is smaller, and to be smaller as the running speed V is greater, the coasting amount of the wheelchair 1 is kept smaller for the small indoor movements for example, so that the small indoor movements with a small turning radius are possible, namely the convenience for the rider is improved. For the outdoor running, since a sufficient coasting amount is secured, a comfortable running is possible on a level road. Further advantage is that, when the wheelchair 1 negotiates a step or the like, since the running speed V is low, the time-attenuation rate is large and therefore the wheelchair 1 does not coast beyond anticipation and the rider gets a stabilized impression.

Furthermore, since the time-attenuation rate of the assist power in the reverse direction during the reverse running is set to be equal to or greater than that in the forward direction during the forward running, the wheelchair 1 does not coast excessively during the reverse running so that no unnecessary impression of fear is given to the rider.

Furthermore, since the time-attenuation rate of the assist power in the reverse direction during the forward running is smaller than that in the reverse direction during the reverse running, when human power is applied to the wheels 2 in the reverse direction to counter the rotation of the wheels 2 by producing brake forces during a steep downhill running, sufficient brake forces remain in the reverse direction and a stabilized downhill running is possible.

The Third Embodiment

Next, the third embodiment of the invention will be described in reference to FIGS. 14 through 16.

The power-assisted wheelchair of this embodiment has also the same fundamental constitution as that of the first embodiment and so its explanation is omitted. Furthermore, in FIG. 14, the same elements as those in FIG. 9 are provided with the same symbols.

Figure 14:
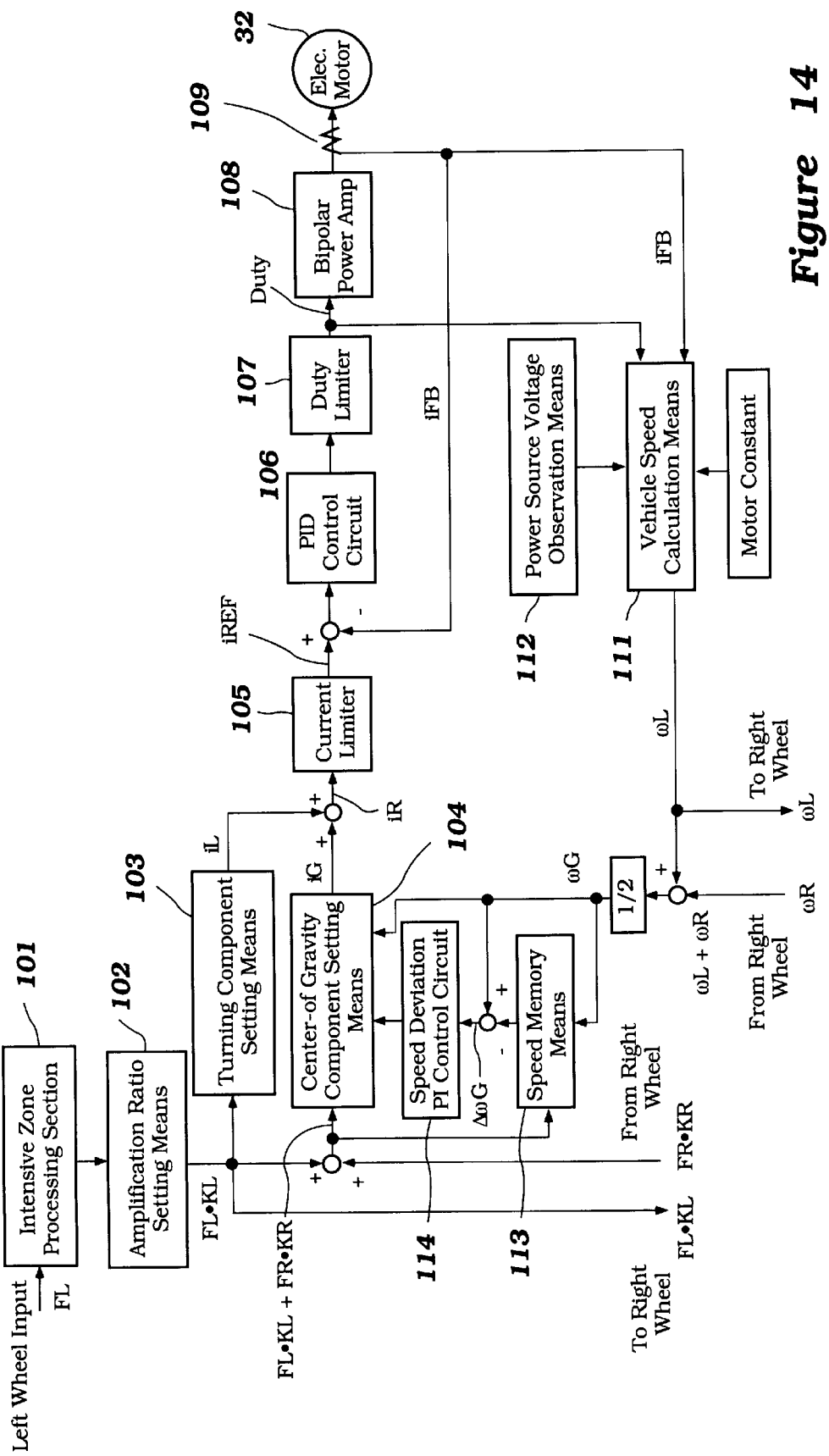
FIG. 14 is a block diagram showing a constitution of a control system of a power-assisted wheelchair as a third embodiment of the invention.

As shown in FIG. 14, the power-assisted wheelchair of this embodiment has a speed memory means 113 for storing the running speed (center-of-gravity speed G) at the time point when the human power (FLKL+FRKR) applied to the wheel 2 is removed, and a speed deviation PI control circuit 114 for detecting the deviation G between the running speed detected with the speed memory means 113 and the current running speed (center-of-gravity speed G). The value determined by integrating the speed deviation G with time is outputted to the center-of-gravity component setting means 104.

Figure 15:
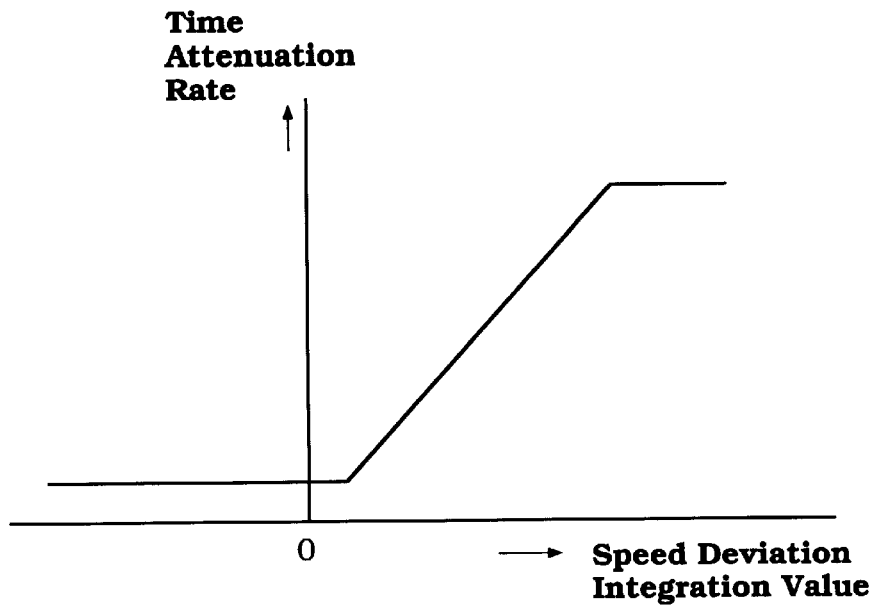
FIG. 15 is a graph showing the relationship between the time-attenuation rate of the assist power and the integrated value of the speed deviation.

Here, this embodiment is characterized in that the time-attenuation rate of the assist power (center-of-gravity torque iG) is changed as shown in FIG. 15 by the time-integrated value of the speed deviation G. That is to say, as shown in FIG. 15, the time-attenuation rate of the assist power is set to be greater as the time-integrated value of the deviation G is greater, and to be smaller as the time integrated value of the deviation G is smaller.

Figure 16:
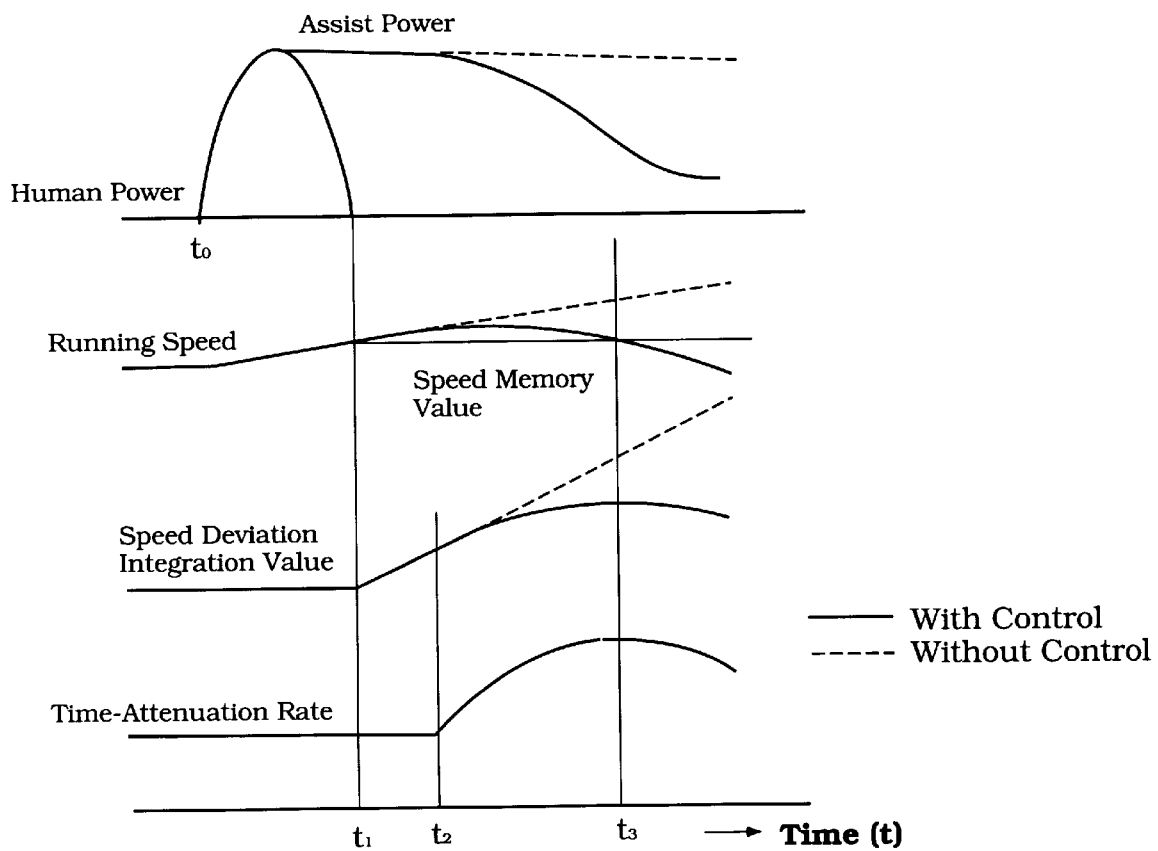
FIG. 16 is a series of graphs showing changes with time in the human power and assist power, running speed, integrated value of the speed deviation, and the attenuation rate with time of the assist power.

Here, changes with time of the human and assist powers, running speed, integrated speed deviation value, and the time-attenuation rate of the assist power are described in reference to FIG. 16.

As shown in the drawing, when human power is applied to each wheel 2 at the time point to, assist power commensurate with the human power is applied to each wheel 2, and the running speed increases gradually. When the human power is removed at the time point $t_1$, the speed memory means 113 stores the running speed at that time point, and the speed deviation PI control circuit 114 calculates the time-integrated value (integrated speed deviation value) of deviation between the running speed stored in the memory means 113 and the current running speed.

Since the time-attenuation rate of the assist power is increased along a curve of secondary degree at the time point ($t_2$ in FIG. 16) when the integrated speed deviation value reaches a specified value, the assist power is attenuated according to the time-attenuation rate as shown in the drawing. As a result, the running speed, with its maximum value being restricted, then turns to the decrease. At the same time, the increase rate with time of the integrated speed deviation value decreases gradually. The time-attenuation rates of the assist power as well as the integrated speed deviation value show their maximum values at the time point ($t_3$) when the running speed decreases to the value stored in the speed memory means 113 (the running speed at the time $t_1$ when the human power is removed), and thereafter both decrease gradually with the decrease in the running speed.

Incidentally, in the case the above described embodiment of control is not used, the running speed and the integrated speed deviation value linearly increase with the lapse of time (t) as shown in broken lines in FIG. 16.

With this embodiment described above, since the time-attenuation rate of the assist power is set to be greater as the integrated speed deviation value is greater, and to be smaller as the integrated speed deviation value is smaller, the wheelchair is prevented from increasing its speed excessively after the removal of human power.

Furthermore, unexpected increase in the speed after starting is prevented even on a road surface of a running resistance smaller than that of the first embodiment, at the time of starting requiring a large operation force.

Furthermore, a sufficient coasting amount is secured even on a steep uphill where the running speed is low in comparison with the second embodiment. This is compatible with the restriction of the coasting amount on the level road having a small running resistance.

Incidentally, while the time-attenuation rate of the assist power in this embodiment is changed according to the time-integrated value of the speed deviation, the time-attenuation rate of the assist power may also be changed with the speed deviation.

Furthermore, while the time-attenuation rate of the assist power is changed according to the magnitude of the human power in the first embodiment, according to the running speed, the running direction, and the input direction of the human power in the second embodiment, and according to the integrated value of the speed deviation (or according to the speed deviation) in the third embodiment, it may be arranged to change the time-attenuation rate of the assist power according to any combination of these parameters (the magnitude of the human power; running speed, running direction, the input direction of the human power; and the speed deviation or integrated value of the speed deviation).

INDUSTRIAL APPLICABILITY

With the invention described above, a power-assisted wheelchair is provided that is capable of running indoors with a small turning radius, running outdoors comfortably, easy uphill running, stabilized downhill running, and removing the impression of fear during a reverse running by securing a required amount of coasting.

What is claimed is:

1. A power-assisted wheelchair having a pair of wheels, each adapted to receive a manual input force for turning said wheels and driving said wheelchair, an electric motor for producing assist power for driving said wheels, detecting means for detecting the human power applied to said wheels, and control means for controlling said electric motor in proportion to the human power detected by said detecting means, said control means controlling said electric motor to produce said assist power when the human power is detected by said detecting means and to attenuate said assist power with the lapse of time after said detecting means senses a reduction in the application of human power, the time-attenuation rate of the assist power being determined from a sensed condition.

2. A power-assisted wheelchair of claim 1, sensed condition is the magnitude of the human power at the time of reduction.

3. A power-assisted wheelchair of claim 2, characterized in that the time-attenuation rate of the assist power is set to be greater as the human power is smaller, and to be smaller as the human power is greater.

4. A power-assisted wheelchair of claim 1 wherein the sensed condition comprises the condition of an adjustment switch.

5. A power-assisted wheelchair of claim 1 further including means for detecting the running speed and wherein the sensed condition comprises the sensed running speed.

6. A power-assisted wheelchair of claim 5, characterized in that the time-attenuation rate of the assist power is set to be greater as the running speed is smaller, and to be smaller as the running speed is greater.

7. A power-assisted wheelchair of claim 5 further including means for sensing the direction of travel and the control means sets the time-attenuation rate of the assist power in the reverse direction during the reverse running equal to or greater than that in the forward direction during the forward running.

8. A power-assisted wheelchair of claim 7, characterized in that the time-attenuation rate of the assist power when manual power is applied in the reverse direction during the forward running is set smaller than that of the assist power in the reverse direction during the reverse running.

9. A power-assisted wheelchair of claim 1 further including means for detecting the running speed, means for detecting the running direction, and speed deviation detecting means for storing the running speed at the time of the removal of the human power applied to the wheels, the sensed condition comprising a deviation between the current running speed and the stored speed, and that the time-attenuation rate of the assist power is changed according to at least one of the speed deviation and the time-integrated value of the speed deviation.

10. A power-assisted wheelchair of claim 9, characterized in that the time-attenuation rate of the assist power is set to be greater as at least one of the speed deviation and the time-integrated value of the speed deviation is greater, and to be smaller as the value is smaller.

11. A method of operating a power assisted manually driven wheel of a vehicle carrying a passenger, said wheel having means for receiving a manual force from the passenger for rotating said wheel, an assist motor for applying driving power to said wheel, said method comprising the steps of sensing the manual force applied to said wheel, operating said assist motor to apply an assist power to said wheel in proportion to the sensed manual force, sensing a reduction in the application of manual force, sensing another condition, and reducing the assist power over a time determined by the other condition when a reduction in the manual force is sensed.

12. A method of claim 11, wherein the sensed condition is the magnitude of the human power at the time of reduction.

13. A method of claim 12, characterized in that the time-attenuation rate of the assist power is set to be greater as the human power is smaller, and to be smaller as the human power is greater.

14. A method of claim 11 wherein the sensed condition comprises the condition of an adjustment switch.

15. A method of claim 11 further including detecting the running speed and wherein the sensed condition comprises the sensed running speed.

16. A method of claim 15, characterized in that the time-attenuation rate of the assist power is set to be greater as the running speed is smaller, and to be smaller as the running speed is greater.

17. A method of claim 15 further including sensing the direction of travel and setting the time-attenuation rate of the assist power in the reverse direction during the reverse running equal to or greater than that in the forward direction during the forward running.

18. A method of claim 17, characterized in that the time-attenuation rate of the assist power when manual power is applied in the reverse direction during the forward running is set smaller than that of the assist power in the reverse direction during the reverse running.

19. A method of claim 11 further including detecting the running speed, detecting the running direction, and storing the running speed at the time of the removal of the human power applied to the wheel, the sensed condition comprising a deviation between the current running speed and the stored speed, and the time-attenuation rate of the assist power is changed according to at least one of the speed deviation and the time-integrated value of the speed deviation.

20. A method of claim 19, wherein the time-attenuation rate of the assist power is set to be greater as at least one of the speed deviation and the time-integrated value of the speed deviation is greater, and to be smaller as the value is smaller.

21. A method of claim 11, wherein there are two wheels each adapted to receive a separate manual force from the passenger and both of which are powered by an assist motor and the assist power maintained upon the reduction of a manual force input is based on an average of the manual and assist powers applied to each wheel at the time of reduction.

* * * * *